Patented Dec. 11, 1934

1,983,529

UNITED STATES PATENT OFFICE 1,983,529

METHOD OF PRODUCING SHEETS OR FILMS OF REGENERATED CELLULOSE

Jacques Edwin Brandenberger, Neuilly-sur-Seine, France, assignor to Du Pont Cellophane Company, Inc., New York, N. Y., a corporation of Delaware No Drawing. Application February 16, 1932, Serial No. 593,416. In France July 11, 1931

3 Claims. (Cl. 18—57)

This invention relates to the manufacture of sheets or films of regenerated cellulose. More particularly, the invention relates to a process of producing sheets or films of regenerated cellulose having a substantially uniform moisture content and to the product resulting therefrom.

In the common and well known method of producing sheets or films of regenerated cellulose, a cellulosic solution, such as viscose, is cast into a coagulating bath and the coagulated film regenerated. In some processes the coagulation and regeneration are effected simultaneously, while in others the two steps are performed consecutively. The regenerated film, after being subjected to purifying treatments (desulphuring and bleaching), is usually passed through a bath containing a cellulose softener, such as glycerin, from whence the film is passed over a plurality of dried rolls where it is dried.

The normal moisture content of a sheet or film of regenerated cellulose in a state of equilibrium in an atmosphere of average hydroscopic degree is approximately 9% or 10% by weight of the cellulose in the film. Films having the following compositions have been found to possess the necessary physical qualities and mechanical requisites for satisfactory practical application:

Example I

| | Per cent by weight |
|---|---|
| Cellulose | 79 |
| Water | 8 |
| Glycerin | 13 |

Example II

| | Per cent by weight |
|---|---|
| Cellulose | 80 |
| Water | 7 |
| Glycerin | 13 |

As apparent from the brief description above, in the methods employed prior to this invention the glycerinated film in the gel state, which generally contains approximately 400% of moisture, was dried by passage of the film over heated drier rolls. Because of the continuous method employed in the manufacture of the regenerated cellulose films, it was practically impossible to stop the drying at any predetermined degree. Consequently, the product was non-uniform and irregular in so far as its moisture content was concerned. Frequently, when the films emerged from the drier, they were either too dry, too wet, or else dried in a very non-uniform manner. The excessively dried films were too brittle and fragile for practical use. The damp films adhered together when cut and packaged, and the irregularly dried films presented surfaces which rendered the material unsuitable for further use.

I have found that by super-drying the film, i. e. drying the film until it possesses a moisture content less than that desired in the final product, for example, less than 9% or 10% by weight of the cellulose, and then subjecting the dried film to a conditioning treatment whereby the moisture content is quickly increased to that desired in the final product, for example, approximately 9% or 10%, I can overcome the above-mentioned defects and produce a sheet or film of regenerated cellulose having a substantially uniform moisture content throughout.

It is therefore an object of this invention to provide sheets or films of regenerated cellulose of substantially uniform moisture content.

Another object of this invention is to provide a method of producing sheets or films of regenerated cellulose of substantially uniform moisture content which comprises drying the sheets or films to such a degree that the moisture content thereof is less than that desired, and then subsequently conditioning the films to quickly increase the moisture content to that desired in the final product.

A further object of this invention is to provide a continuous method of producing sheets or films of regenerated cellulose of substantially uniform moisture content.

Other objects will appear from the following description and appended claims.

In carrying out the instant invention, a thin film of a cellulosic solution, such as a viscose solution, is cast into a coagulating bath and the coagulated film regenerated. The coagulation and regeneration steps may be performed simultaneously or consecutively, as desired. The regenerated cellulose film is then subjected to the action of certain baths for the purpose of desulphuring, bleaching, dyeing, glycerinating, etc., as well known in the art.

In accordance with the principles of the instant invention, the glycerinated gel film containing approximately 400% by weight of water is introduced in a drier where it is super-dried, i. e. the moisture content thereof is reduced to less than that required in the final film. For example, when the moisture content in the final film is desired to be approximately 9% or 10% by weight of the cellulose, then the gel film is dried to such a degree that the moisture content is less than 9% or 10%. The super-dried film is then subjected to a treatment, whereby the moisture content of the dried film is quickly increased to that desired in the final product, as, for example, to 9% or 10% by weight of the cellulose.

The super-drying of the film may be performed by any one of numerous procedures. In order to utilize the machinery now used in the production of sheets or films of regenerated cellulose, I prefer to super-dry the film by passing the film over drier rolls identical or similar to those now used, the rolls, of course, being maintained at the appropriate temperature to produce the desired results.

The last phase of the procedure (increasing the moisture content) can be advantageously effected by subjecting the super-dried film to the action of an atmosphere of relatively high humidity. Such an atmosphere will rapidly restore to the film the complement of the necessary moisture.

The atmosphere of relatively high humidity can be produced in numerous ways. The humid air at the entrance of the drier may be withdrawn and, after cooling, if necessary, to a suitable temperature, may be introduced into the conditioning chamber. Likewise, if desired, water in the form of vapor or spray may be injected into the atmosphere intended to serve for the conditioning.

The hygroscopic conditions of the atmosphere depend on the rapidity of the action which is desired. Generally, the atmosphere is very humid or saturated and the speed of the passage of the film therethrough is controlled and regulated so that the restoration of the desired quantity of moisture may be effected as rapidly as possible. Rapid conditioning has been accomplished by passing the super-dried film through an atmosphere of saturated or slightly super-heated vapor at 100° C.

In one specific embodiment, the conditioning of the super-dried film may be effected by passing the film through a compartment equipped with rolls similar to the drying rolls and provided with an atmosphere of the appropriate humidity. The rolls may be heated or not, as desired, depending on the temperature of the atmosphere. Thus if humid, temperature-controlled air is used, the rolls may remain unheated, i. e., acquire the temperature of the conditioning chamber. On the other hand, if unconditioned air is used, the rolls may be chilled by the passage of cold water therethrough or, if necessary, heated by hot water or steam.

It is apparent that the conditioning treatment may be carried out in an operation continuous with the production of the film or in an operation distinct and separate from the production of the film. In the former case, the conditioning apparatus may be disposed at any point intermediate the drier and wind-up device or adjacent the drier, so that, as the super-dried film emerges from the drier, it can conveniently pass through the conditioning apparatus. In the latter case, the conditioning apparatus may be positioned wherever desired. When the conditioning is carried out in an operation distinct from the manufacture of the film, a roll of super-dried film may be disposed in the conditioning chamber and the film unreeled therein and passed through the atmosphere. Alternatively, the roll of film may be disposed outside the conditioning chamber and the film as it is unwound therefrom may be passed through the conditioning chamber.

Though the specific embodiment of the invention was described in connection with glycerinated films, the principles of the invention are equally applicable to glycerin-free materials or materials containing a softener other than glycerin.

The product resulting from the method hereinbefore described is characterized by a moisture content which is substantially uniform throughout the length and breadth of the film. By a proper control of the process, the desired quantity of moisture in the final film may be secured with extreme facility. Due to the fact that the method contemplates the use of the apparatus now being employed and particularly the drying rolls thereof, it will not be expensive to adapt it to the present day machinery.

Since it is obvious that various changes and modifications may be made in the above description without departing from the nature or spirit thereof, this invention is not restricted thereto except as set forth in the appended claims.

I claim:

1. A method of producing sheets or films of regenerated cellulose of substantially uniform moisture content which comprises drying the sheet or film containing moisture considerably in excess of 10% by weight of the cellulose until the moisture content thereof is less than 10% by weight of the cellulose and then quickly increasing the moisture to approximately 10% by weight of the cellulose.

2. A continuous method of producing sheets or films of regenerated cellulose of substantially uniform moisture content which comprises casting a cellulosic solution to produce a sheet or film of regenerated cellulose in the gel state, drying the sheet or film until the moisture content thereof is less than 10% by weight of the cellulose and then quickly increasing the moisture content to approximately 10% by weight of the cellulose.

3. A continuous method of producing sheets or films of regenerated cellulose of substantially uniform moisture content which comprises casting a viscose solution to produce a sheet or film of regenerated cellulose in the gel state, drying the sheet or film until the moisture content thereof is less than 10% by weight of the cellulose and then quickly increasing the moisture content to approximately 10% by weight of the cellulose.

JACQUES EDWIN BRANDENBERGER.